US007917517B2

(12) United States Patent
Aggarwal et al.

(10) Patent No.: US 7,917,517 B2
(45) Date of Patent: Mar. 29, 2011

(54) METHOD AND APPARATUS FOR QUERY PROCESSING OF UNCERTAIN DATA

(75) Inventors: Charu C. Aggarwal, Mohegan Lake, NY (US); Philip Shi-Lung Yu, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 12/039,091

(22) Filed: Feb. 28, 2008

(65) Prior Publication Data

US 2009/0222410 A1  Sep. 3, 2009

(51) Int. Cl.
*G06F 17/30* (2006.01)

(52) U.S. Cl. ........................................ 707/741; 707/742

(58) Field of Classification Search ........................ None
See application file for complete search history.

(56) References Cited

U.S. PATENT DOCUMENTS 6,502,091 B1 * 12/2002 Chundi et al. ................ 707/738

OTHER PUBLICATIONS

R. Cheng et al., "Efficient Indexing Methods for Probablistic Threshold Queries Over Uncertain Data," VLDB Conference, 2004, pp. 876-887.*
C.C. Aggarwal et al., "The IGrid Index: Reversing the Dimensionality Curse in High Dimensional Space," ACM KDD Conference, 2000, 11 pages.
C.C. Aggarwal, "On Density Based Transforms for Uncertain Data Mining," IEEE ICDE Conference, 2007, 10 pages.
C.C. Aggarwal et al, "A Survey of Uncertain Data Algorithms and Applications," IBM Research Report, RC24394, 2007, 40 pages.
D. Barbara et al., "The Management of Probabilistic Data," IEEE Transactions on Knowledge and Data Engineering, pp. 487-502, 1992, vol. 4, No. 5.
N. Beckmann et al., "The R*-Tree: An Efficient and Robust Access Method for Points and Rectangles," ACM SIGMOD Conference, 1994, pp. 322-331.
S. Berchtold et al., "The X-Tree: An Index Structure for High Dimensional Data," VLDB Conference, 1996, 12 pages.
D. Burdick et al., "OLAP Over Uncertain and Imprecise Data," VLDB Conference, 2005, pp. 970-981.
R. Cheng et al., "Efficient Indexing Methods for Probabilistic Threshold Queries Over Uncertain Data," VLDB Conference, 2004, pp. 876-887.
R. Cheng et al., "Evaluating Probabilistic Queries over Imprecise Data," ACM SIGMOD Conference, 2003, 12 pages.
N. Dalvi et al., "Efficient Query Evaluation on Probabilistic Databases," VLDB Conference, 2004, pp. 864-875.
A. Das Sarma et al., "Working Models for Uncertain Data," IEEE ICDE Conference, 2006, 21 pages.
A. Hinneburg et al., "What is the Nearest Neighbor in High Dimensional Spaces?," VLDB Conference, 2000, pp. 506-515.
H.-P. Kriegel et al., "Density-Based Clustering of Uncertain Data," ACM KDD Conference, 2005, pp. 672-677.
L.V.S Lakshmanan et al., "ProbView: A Flexible Database System," ACM Transactions on Database Systems, 1997, pp. 419-469, vol. 22, No. 3.

(Continued)

*Primary Examiner* — Baoquoc To
(74) *Attorney, Agent, or Firm* — William Stock, Esq.; Ryan, Mason & Lewis, LLP

(57) ABSTRACT

Techniques are disclosed for indexing uncertain data in query processing systems. For example, a method for processing queries in an application that involves an uncertain data set includes the following steps. A representation of records of the uncertain data set is created based on mean values and uncertainty values. The representation is utilized for processing a query received on the uncertain data set.

18 Claims, 2 Drawing Sheets

OTHER PUBLICATIONS

S.I. McClean et al., "Aggregation of Imprecise and Uncertain Information," IEEE Transactions on Knowledge and Data Engineering, 2001, pp. 902-912, vol. 13, No. 6.

D. Pfozer et al., "Capturing the Uncertainty of Moving Object Representations," SSDM Conference, 1999, 17 pages.

S. Singh et al., "Indexing Uncertain Categorical Data," IEEE ICDE Conference, 2007, 10 pages.

Y. Tao et al., "Indexing Multi-dimensional Uncertain Data with Arbitrary Probabality Density Functions," VLDB Conference, 2005, pp. 922-933.

\* cited by examiner

METHOD AND APPARATUS FOR QUERY PROCESSING OF UNCERTAIN DATA

This invention was made with Government support under Contract No. H98230-07-C-0383 awarded by the Department of Defense. The Government has certain rights in this invention.

FIELD OF THE INVENTION

The present invention relates to query processing systems and, more particularly, to techniques for indexing uncertain data in such query processing systems.

BACKGROUND OF THE INVENTION

In recent years, many advanced technologies have been developed to store and record large quantities of data continuously. In many cases, the data may contain errors or may be only partially complete. For example, sensor networks typically create large amounts of uncertain data sets. In other cases, the data points may correspond to objects which are only vaguely specified, and are therefore considered uncertain in their representation. Similarly, surveys and imputation techniques create data which is uncertain in nature. This has created a need for uncertain data management algorithms and applications.

In uncertain data management, data records are represented by probability distributions rather than deterministic values. Therefore, a data record is represented by the corresponding parameters of a multi-dimensional probability distribution. Some examples in which uncertain data management techniques are relevant are as follows:

The uncertainty may be a result of the limitations of the underlying equipment. For example, the output of sensor networks is often uncertain. This is because of the noise in sensor inputs or errors in wireless transmission.

In many cases such as demographic data sets, only partially aggregated data sets are available. Thus, each aggregated record is actually a probability distribution.

In privacy-preserving data mining applications, the data is perturbed in order to preserve the sensitivity of attribute values. In some cases, probability density functions of the records may be available.

In some cases, data attributes are constructed using statistical methods such as forecasting or imputation. In such cases, the underlying uncertainty in the derived data can be estimated accurately from the underlying methodology.

The problems of distance function computation and indexing are closely related, since the construction of the index can be sensitive to the distance function. Furthermore, effective distance function computation is inherently more difficult in the high dimensional or uncertain case. Direct extensions of distance functions such as the $L_q$-metric are not very well suited to the case of high dimensional or uncertain data management. This is because these distances are most affected by the dimensions which are most dissimilar. In the high dimensional case, the statistical behavior of the sum of these dissimilar dimensions leads to the sparsity problem. This results in similar distances between every pair of points, and the distance functions are often qualitatively ineffective (see, e.g., A. Hinneburg, C. Aggarwal and D. Keim, "What is the nearest neighbor in high dimensional spaces?" VLDB Conference, (2000), the disclosure of which is incorporated by reference herein). Furthermore, the dimensions which contribute most to the distance between a pair of records are also likely to have the greatest uncertainty. Therefore, the effects of high dimensionality are magnified by the uncertainty, and the contrast in distance function computations is lost. The challenge is to design a distance function which continues to be both qualitatively effective and index-friendly.

The problem of indexing has been studied in the literature both for the case of deterministic data (see, e.g., N. Beckmann, H-P. Kriegel, R. Schneider and B. Seeger, "The R*-Tree: An Efficient and Robust Access Method for Points and Rectangles," ACM SIGMOD Conference, (1994); and S. Berchtold, D. Keim and H-P. Kriegel, "The X-Tree: An Index Structure for High Dimensional Data," VLDB Conference, (1996), the disclosures of which are incorporated by reference herein), and for the case of uncertain data (R. Cheng, Y. Xia, S. Prabhakar, R. Shah and J. Vitter, "Efficient Indexing Methods for Probabilistic Threshold Queries over Uncertain Data," VLDB Conference, (2004); R. Cheng, D. Kalashnikov and S. Prabhaker, "Evaluating Probabilistic Queries over Imprecise Data}," ACM SIGMOD Conference, (2003); S. Singh, C. Mayfield, S. Prabhakar, R. Shah, and S. Hambrusch, "Indexing Uncertain Categorical Data," IEEE ICDE Conference, (2007); and Y. Tao, R. Cheng, X. Xiao, W. Ngai, B. Kao and S. Prabhakar, "Indexing Multi-dimensional Uncertain Data with Arbitrary Probability Density Functions," VLDB Conference, (2005), the disclosures of which are incorporated by reference herein).

SUMMARY OF THE INVENTION

Principles of the invention provide techniques for indexing uncertain data in query processing systems.

In one embodiment, a method for processing queries in an application that involves an uncertain data set comprises the following steps. A representation of records of the uncertain data set is created based on mean values and uncertainty values. The representation is utilized for processing a query received on the uncertain data set.

Further, the representation of records may comprise one or more inverted lists ordered by mean values. The representation of records may comprise one or more inverted lists ordered by uncertainty values. The query may comprise a range query in which a user specifies a range and threshold probability. The query may comprise a similarity query in which the user specifies a target record.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
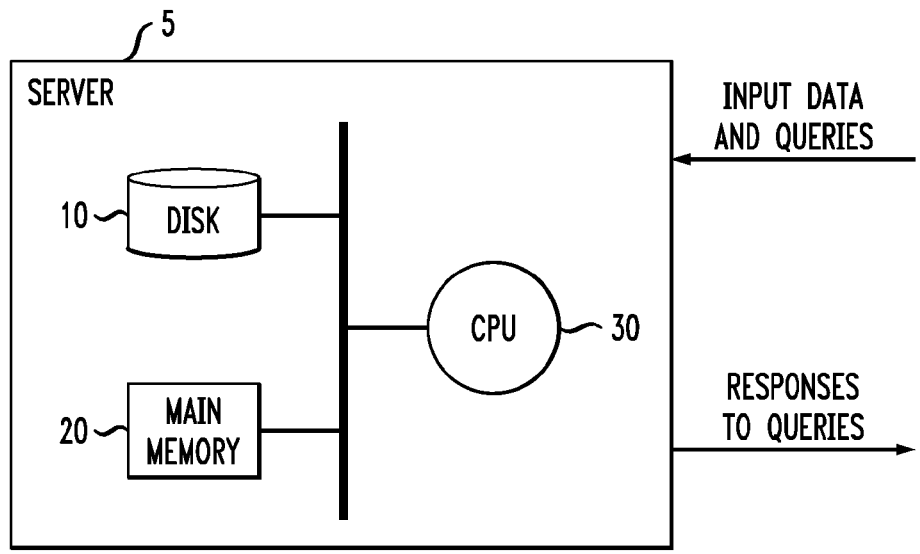
FIG. 1 shows a computing architecture according to an embodiment of the invention.

Principles of the invention can be used in a wide variety of query processing applications, including but not limited to, querying of records in sensor data applications, demographic data applications, and privacy-preserving data mining applications. By way of example only, in a sensor data application, records could be temperature or light readings from a sensor network along with the variance in the corresponding readings. This variance represents the inherent uncertainty in the sensor readings. The query to be processed might be a nearest neighbor query. For example, for a particular (temperature, intensity) combination, we may wish to determine the closest sensor reading.

Furthermore, principles of the invention realize that indexing high dimensional and uncertain data raises some unique challenges, such as follows:

Similarity functions need to be carefully designed for the high dimensional and uncertain case in order to maintain contrast in similarity calculations. Furthermore, the distance function needs to be sensitive to the use of an index.

In most cases, the similarity or range queries are only performed on a small subset of the dimensions of high dimensional data. For example, in many applications, we are likely to perform a range query only over 3 to 4 dimensions of a 100-dimensional data set. Such queries cannot be processed with the use of traditional index structures, which are designed for full-dimensional queries.

Examples of queries which can be resolved with the use of an index structure according to an embodiment of the invention are as follows:

Determine the nearest neighbor to a given target record in conjunction with an effective distance function.

Determine the nearest neighbor to the target T by counting the expected number of dimensions for which the points lie within user-specified threshold distances $t_1 \ldots t_d$. In practical applications, only a small number of the threshold values $t_1 \ldots t_d$ may be specified, and the remaining are assumed to be infinity. In such cases, the nearest neighbor search is performed only over a small number of projected dimensions which are relevant to that application.

For a given subset of dimensions S, and a set of ranges R(S) defined on the set S, determine the points which lie in R(S) with probability greater than delta. We note that this particular query is referred to as a projected range query, since we are using only a subset of the dimensions.

It will be shown that the key is to construct a distance function which can be computed efficiently in the high dimensional case, and is both qualitatively effective and index-friendly. We will refer to this index structure as Uni-Grid (or UNcertain Inverted GRID Structure).

We now summarize techniques for construction of the distance function and the index for uncertain data according to an embodiment of the invention. We will show how the uncertainty in the data can influence the behavior of the underlying distance function. Then, we will discuss different ways of constructing an uncertain function for distance computation, and their effectiveness in the high dimensional case. We will also discuss a dimensionality-dependent approach for optimizing the design of the distance function. We will first introduce some notations and definitions.

We assume that the uncertain data base D contains a set of N records, each with a dimensionality of d. The records in D are denoted by $X_1 \ldots X_N$. The individual components of $X_i$ are denoted by $(x_i^1, f_i^1(\cdot)) \ldots (x_i^d, f_i^d(\cdot))$. Here $x_i^j$ denotes the value for the i-th record on the j-th dimension, and $f_i^j(\cdot)$ denotes the probability density function (pdf) for the i-th record on the j-th dimension. We assume that the pdfs across the different dimensions are independent of one another. We note that $x_i^j$ is the mean of the pdf $f_i^j(\cdot)$, and therefore the value $x_i^3$ can be omitted entirely without loss of completeness in record description. Nevertheless, we will preserve it for ease in notation.

A straightforward design of a distance function would simply generalize the standard $L_k$ metric to the case of uncertain data sets without using the uncertainty information. Thus, the raw values of $x_i^3$ can be used for computation purposes. However, such a definition may over-estimate or under-estimate the distance values when there is skew across the uncertainty behavior of different attributes. By "skew" we refer to the fact that the relative level of uncertainty across different attributes may be very different.

A natural alternative is to use the expected distance between two data points. We denote the random variable for the distance between data points $X_i$ and $X_j$ along the kth dimension by $d_k(X_i, X_j)$. The expected value of this random variable is denoted by $E[d_k(X_i, X_j)]$. The expected distance between points $X_i$ and $X_j$ along the dimension k is denoted by $E[\|x_i^k - x_j^k\|]$. By integrating over different values of x.

We note that the above expression is designed for the case of the Manhattan metric. It is possible to design similar metrics for the case of the general $L_p$-metric.

We note that the use of expected distances can sometimes result in noisy distance functions when the error is large. This is because metrics such as the $L_p$-metric are dominated by the large terms which are created by errors along individual dimensions. As a result, the similarity function may lose its effectiveness with increasing uncertainty. A more effective distance function is one which only counts dimensions that are probabilistically close to the dimensions above a certain threshold. These functions are actually similarity functions rather than distance functions, since larger values imply greater similarity. Furthermore, such functions can be specifically tailored to contrast conditions, which guarantee effectiveness with increasing dimensionality. We define the probabilistic proximity functions $G(X, Y, s^1 \ldots s^d)$ for thresholds $s^1 \ldots s_d$ as follows:

The probabilistic function $G(X, Y, s^1 \ldots s^d)$ is defined as the expected number of dimensions for which the distance between the k-th attribute values in X and Y is less than $s^k$. The value of $s^k$ is chosen in an automated way by analyzing the local behavior of the underlying data along the k-th dimension.

Let us define the probability that the distance of X and Y along the dimension k is less than $s^k$ by $h_k(X, Y, s^k)$. Then, the expected number of dimensions $G(\overline{X}_i, \overline{X}_j, s^1 \ldots s^d)$ on which $X_i$ and $X_j$ are closer to one another than the threshold $s^k$ is given by:

$$G(\overline{X}_i \cdot \overline{X}_j \cdot s^1 \ldots s^d) = \sum_{k=1}^{d} h_k(x_i^k, x_j^k, s^k)$$

We note that the computation of $f_k(\cdot)$ is typically more locality sensitive, since we need to consider only values of the attribute within immediate locality of the target. This is useful from an indexing point of view, since we are typically trying to find records within the locality of a particular target or a pre-specified range.

In some practical applications, it may be desirable to let the user pick only a subset of dimensions over which the similarity is computed. In the most general case, even the threshold for each dimension may vary. For example, the thresholds over the d different dimensions may be set $t_1 \ldots t_d$. We note that the only difference between this query and the previous query is that the thresholds $t_1 \ldots t_d$ are chosen by the user, whereas the thresholds $s^1 \ldots s^d$ are chosen in an automated way. Some of the values of $t_i$ may be set to infinity, which results in (differential) counting over only a relevant subset of dimensions. If desirable, some of the values of $t_i$ may be set to infinity, whereas the other values corresponding to $s^i$ may be chosen in an automated way as discussed subsequently. This results in a classical projected similarity query in which only a small subset of the dimensions is used for counting. This is a particularly difficult query to handle with the use of typical index structures. However, we will show that the UniGrid structure is very efficient in resolving these kinds of queries. As in the previous case, this kind of query has a dimension-specific locality which is inherently index-friendly. Next, we will discuss how the thresholds $s^1 \ldots s^d$ are chosen in a dimension-specific way.

In the UniGrid structure, we construct a two-level inverted partitioning of the data. In this technique, we create an inverted list of record identifiers separately for each attribute in the data. We create an inverted list of record identifiers for all points whose mean value and uncertainty lie within certain pre-specified ranges. The first level of the partitioning uses the mean value of the probability density function for that record, and the second level further partitions the set of records with mean value in a given range by using the uncertainty in the range for the corresponding probability density function.

In order to construct the first level of the inverted partitioning, we divide each attribute into a set of equi-depth ranges. The boundaries for the equi-depth ranges for attribute i are contained in $l(i, 1), u(i, 1)], [l(i, 2), u(i, 2)] \ldots [l(i, q), u(i, q)]$, and we assume that $u(i, k)=l(i, k+1)$ for each k in $1 \ldots q-1$. The value of q is typically chosen to be a multiple of $1/f$. Since f is chosen such that the value of $1/f$ is chosen so as to be an integer, it follows that q is an integer as well.

Here $[l(i, r), u(i, r)]$ represents the r-th range for the attribute i. All record identifiers whose i-th attribute lies in the range $[l(i, r), u(i, r)]$ can be found in one of a group of inverted lists for this range. A second level of the partitioning is defined by the uncertainty level. This second level uniquely defines the inverted list for a given record identifier from within the group of lists belonging to the range $l(i, r), u(i, r)]$. There are approximately N/q record identifiers in each range of the first level of the partitioning. For the second level of the partitioning, we construct ranges for the uncertainty by using the behavior of the probability density function of the uncertainty. We make the assumption that the probability distribution functions are defined over a finite range. This is without loss of generality, since the insignificant tails for the uncertainty function can be removed. For example, for a Gaussian uncertainty function, any tail beyond 3 standard deviations from the mean can be ignored to a level of accuracy beyond 99.99%. The span of the uncertainty function is defined by half the distance between the left and right boundaries of the uncertainty function. The data points within the range $[l(i, r), u(i, r)]$ are divided into a set of s equi-depth ranges depending upon the corresponding span. It is assumed that the absolute upper and lower bounds for the range corresponding to the t-th span are denoted by $[ls(i, r, t), us(i, r, t)]$. Thus, the length of the t-th span is $(us(i, r, t)-ls(i, r, t))/2$. Each span points to an inverted list which contains approximately N/qs record identifiers. Each entry of the inverted contains the following information:

1. The mean value of the corresponding record.
2. The probability density function for the record $X_m$ and the attribute i, which is denoted by $f_m^i(\cdot)$.

In addition, we store some meta-information along both levels of the hierarchy of the inverted lists. This meta-information is as follows:
For each node at the first level of the hierarchy, we store the upper and lower bound of the corresponding discretized attribute range. These upper and lower bounds are denoted by $u(i, r)$ and $l(i, r)$ respectively.
For each node at the second level of the hierarchy, we store the upper and lower bounds for the uncertainty span which are denoted by $us(i, r, t)$ and $ls(i, r, t)$ respectively.

For the case of similarity queries, we assume that we have a target record Y, along with the uncertainty function $h(\cdot)$. We will consider the case of similarity queries in which we are computing the expected number of dimensions which lie within the thresholds $t_1 \ldots t_d$. We note that this query is exactly similar to the case when we are using automated thresholds $s^1 \ldots s^d$. The d dimensions of Y are denoted by $(y^1 \ldots y^d)$. In many applications, the target record may be deterministic. In such cases, we can assume that the uncertainty function is deterministic with zero span. We also assume that the midpoints of the corresponding probability density functions (between the left and right boundary) are denoted by $(z^1 \ldots z^d)$. We note that the midpoint may be different from the corresponding mean. In order to resolve the queries, we determine those records whose span intersects with the corresponding inverted lists. The corresponding probabilities are computed for these records and then used to compute the records whose probabilities of lying with the corresponding range lie above a given threshold.

Given the above summarization of indexing techniques according to an embodiment of the invention, we now describe implementations of such techniques in the context of an illustrative system and methodologies.

FIG. 1 shows a computing architecture for use in implementing an embodiment of the invention. The indexing is performed at the server 5. The input to the server is the data and the queries. The data is basically the raw uncertain data on which the index is constructed. The server contains a disk 10, main memory 20, and central processing unit (CPU) 30. The index is constructed from the data and is stored on the disk. This index is used in order to resolve the queries. The main memory is used for caching, which can speed up the responses to the queries. The computations for the queries are performed at the CPU.

Thus, it is to be understood that FIG. 1 illustrates a computer system in accordance with which one or more components/steps of the techniques of the invention may be implemented. It is to be further understood that the individual components/steps may be implemented on one such computer system or on more than one such computer system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computer system shown in FIG. 1 may represent one or more servers or one or more other processing devices capable of providing all or portions of the functions described herein. Alternatively, FIG. 1 may represent a mainframe computer system.

The computer system may generally include a processor (CPU 30), memory (disk 10 and main memory 20), input/output (I/O) devices (not expressly shown), and network interface (not expressly shown), coupled via a computer bus or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard disk drive), a removable memory device (e.g., diskette), flash memory, etc. The memory may be considered a computer readable storage medium.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Figure 2:
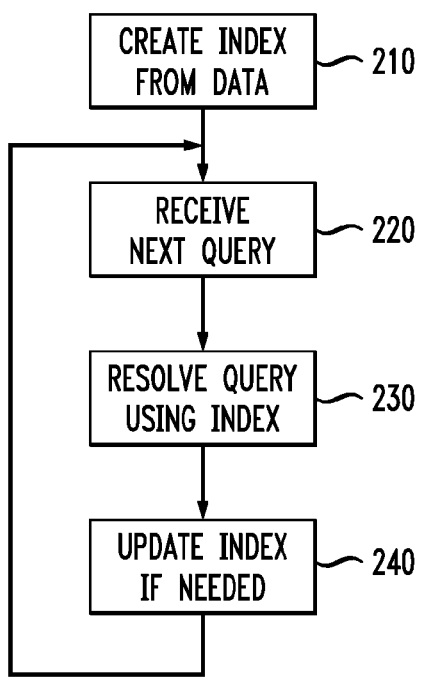
FIG. 2 shows an indexing and query process according to an embodiment of the invention.

FIG. 2 illustrates a process of constructing and using the uncertain data index according to an embodiment of the invention. The broad idea is to first create an initial index, and then utilize it for query processing. The detailed description of the various steps in FIG. 2 is provided in later figures. In step 210, an index is created on the uncertain data set. As discussed above, this is a two level inverted index structure.

Figure 3:
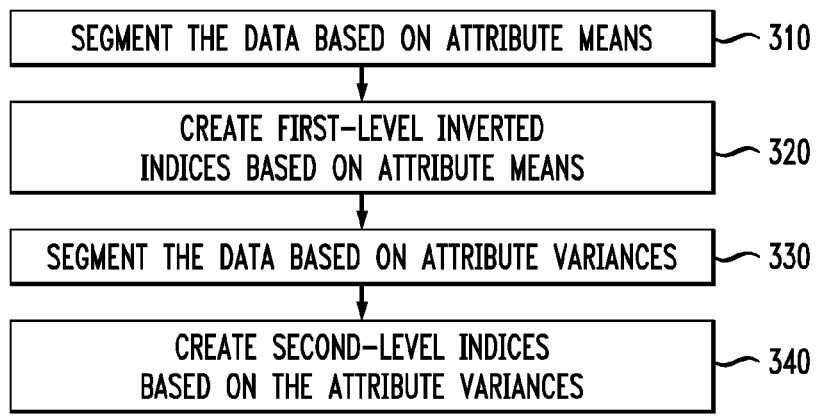
FIG. 3 shows a process of creating a two-level index according to an embodiment of the invention.
Figure 4:
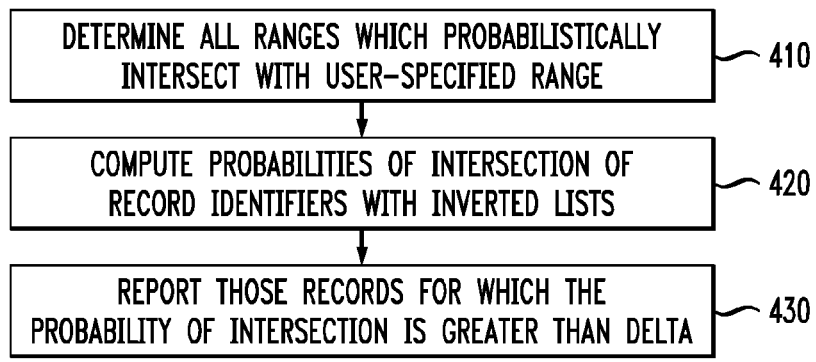
FIG. 4 shows a process of performing range queries with an index according to an embodiment of the invention.
Figure 5:
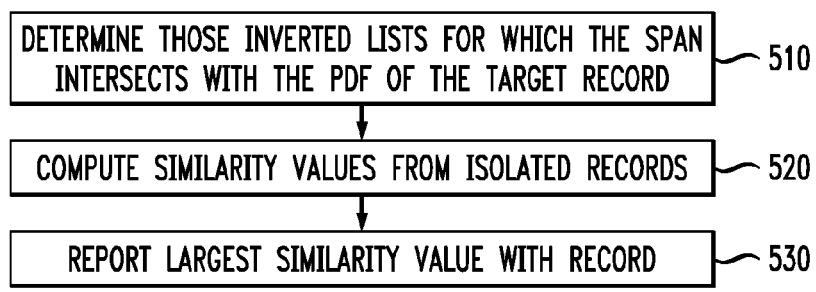
FIG. 5 shows a process of performing similarity queries with an index according to an embodiment of the invention.

A detailed description of how this structure is created is provided in FIG. 3. In step 220, the next query in the data is received. This query could either be a range query or a similarity query. Depending upon the nature of the query, the index structure is used to resolve it in different ways. This is done in step 230. If the query is a range query, then the approach of FIG. 4 is used to resolve it. On the other hand, if the query is a similarity query, then the approach of FIG. 5 is used to resolve it. In step 240, a check is performed to determine if more data has been received by the system. We note that if the application is a dynamic application, then it is possible that more data may arrive periodically. If such is the case, then in step 240 the index is updated appropriately. Then, the process returns to step 220, and receives the next query, which is resolved for further processing.

In FIG. 3, an index creation process according to an embodiment of the invention is shown. This can be considered a detailed description of step 210 of FIG. 2. We note that the index has two levels, one of which is based on attribute mean, and the other is based on attribute-variance. In step 310, the process segments the data according to the attribute means along the different dimensions. The data is divided into equi-depth ranges, so that each range has an equal number of records. In step 320, the process creates inverted indices along these equi-depth ranges. In other words, for each range, the process computes the list of record-identifiers which correspond to this equi-depth range. These lists of record identifiers are further segmented based on the variance of their corresponding probability density function. The variances are also segmented into equi-depth fashion, so that each range contains an equal number of records. This segmentation is done in step 330. In step 340, the process creates the second level of the index based on attribute variances. We note that the actual record-identifiers are stored at the leaf level of this index structure. These record identifiers are used to respond to various kinds of queries such as range queries or similarity queries.

FIG. 4 illustrates an approach for performing the range queries according to an embodiment of the invention. This can be considered a detailed description of step 230 of FIG. 2. The input to the query is a user-specified range, and a probability threshold. It is desired to determine all the records which lie within this range with the pre-specified probability. The main idea is to use the inverted lists in order to determine those records which lie within the user specified range with the pre-specified probability value. This is done in step 410. We note that step 410 can be performed effectively because of the two level organization of the inverted lists which are maintained both on the mean value and the span of the corresponding records. Along each dimension in the range, the process determines the probability that a record lies within the user-specified range. These probabilities are multiplied together in order to determine the composite probability that each record lies in the corresponding user-specified range. These probabilities are computed in step 420. All records which lie above the user-specified threshold of delta are determined. These records are reported in step 430.

FIG. 5 illustrates an approach used in order to perform similarity search over the index according to an embodiment of the invention. This can also be considered an alternative detailed description of step 230 of FIG. 2. We note that since the similarity function uses a thresholding approach, not all records are relevant to the similarity function. Therefore, the first step is to determine those inverted lists for which the span intersects with the probability density function of the target record. These records are isolated in step 510. We note that step 510 can be performed effectively because of the two level organization of the inverted lists which are maintained both on the mean value and the span of the corresponding records. Once these records have been isolated, the process can compute the similarity values for the corresponding records and dimensions in step 520. The process sorts these similarity values in step 530, and reports the corresponding largest similarity value.

In accordance with embodiments of the invention, we presented a method for distance function computation and indexing of high dimensional uncertain data. We designed an effective method for performing the distance function computations in high dimensionality, so that the contrast in the distances is not lost. We explored the unique issues which arise in the context of performing range or similarity searches in a subset of the dimensions. Such queries cannot be easily resolved with the use of traditional index structures. In order to effectively handle these issues, we designed the UniGrid Index which uses a two level inverted representation for querying purposes.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of processing queries in an application that involves an uncertain data set, comprising the steps of:
    creating a representation of records of the uncertain data set based on mean values and uncertainty values; and
    utilizing the representation for processing a query received on the uncertain data set;
    wherein the representation of records comprises a multi-level inverted index structure comprising one or more inverted lists;
    wherein some levels of the index structure are partitioned by mean values, and other levels are partitioned by uncertainty values; and
    wherein the steps are performed at least in part by a processor device.

2. The method of claim 1, wherein at least a subset of the one or more inverted lists are ordered by mean values.

3. The method of claim 1, wherein at least a subset of the one or more inverted lists are ordered by uncertainty values.

4. The method of claim 1, wherein at least a subset of the one or more inverted lists are ordered by both mean values and uncertainty values.

5. The method of claim 1, wherein the query comprises a range query in which a user specifies a range and threshold probability.

6. The method of claim 5, wherein lists whose spans intersect with the user-specified range are isolated.

7. The method of claim 5, wherein probabilities across different dimensional ranges are multiplied together.

8. The method of claim 5, wherein those records are reported for which a computed probability is greater than a threshold delta.

9. The method of claim 1, wherein the query comprises a similarity query in which the user specifies a target record.

10. The method of claim 9, wherein lists whose spans intersect with a probability density function of the target record are isolated.

11. The method of claim 9, wherein a similarity value is computed over all isolated records.

12. The method of claim 9, wherein the record with the largest similarity value is reported.

13. An article of manufacture for processing queries in an application that involves an uncertain data set, comprising a computer readable storage medium including one or more programs which when executed by a computer perform the steps of:
    creating a representation of records of the uncertain data set based on mean values and uncertainty values; and
    utilizing the representation for processing a query received on the uncertain data set;
    wherein the representation of records comprises a multi-level inverted index structure comprising one or more inverted lists; and
    wherein some levels of the index structure are partitioned by mean values, and other levels are partitioned by uncertainty values.

14. Apparatus for processing queries in an application that involves an uncertain data set, comprising:
    a memory; and
    at least one processor coupled to the memory and operative to create a representation of records of the uncertain data set based on mean values and uncertainty values, and utilize the representation for processing a query received on the uncertain data set;
    wherein the representation of records comprises a multi-level inverted index structure comprising one or more inverted lists; and
    wherein some levels of the index structure are partitioned by mean values, and other levels are partitioned by uncertainty values.

15. The apparatus of claim 14, wherein at least a subset of the one or more inverted lists are ordered by mean values.

16. The apparatus of claim 14, wherein at least a subset of the one or more inverted lists are ordered by uncertainty values.

17. The apparatus of claim 14, wherein the query comprises a range query in which a user specifies a range and threshold probability.

18. The apparatus of claim 14, wherein the query comprises a similarity query in which the user specifies a target record.

* * * * *